(12) United States Patent
Nomura (10) Patent No.: US 7,004,691 B2
(45) Date of Patent: Feb. 28, 2006

(54) DEEP HOLE CUTTER

(75) Inventor: Takuji Nomura, Amagasaki (JP)

(73) Assignee: Unitac Incorporated, Hyogo (JP)

( * ) Notice: Subject to any disclaimer, the term of this patent is extended or adjusted under 35 U.S.C. 154(b) by 308 days.

(21) Appl. No.: 10/695,842

(22) Filed: Oct. 29, 2003

(65) Prior Publication Data

US 2004/0096283 A1 May 20, 2004

(30) Foreign Application Priority Data

Nov. 15, 2002 (JP) .............................. 2002-332125
Jun. 18, 2003 (JP) .............................. 2003-173886

(51) Int. Cl.
*B23B 51/00* (2006.01)
*B23B 51/02* (2006.01)

(52) U.S. Cl. ...................... 408/59; 408/223; 408/229

(58) Field of Classification Search .................. 408/59, 408/57, 56, 223, 227, 229, 230, 233, 713; 408/705; B23B 51/00, 51/02
See application file for complete search history.

(56) References Cited

U.S. PATENT DOCUMENTS

| | | | | |
|---|---|---|---|---|
| 2,325,973 A | * | 8/1943 | Nurnberger et al. | 408/59 |
| 2,346,546 A | * | 4/1944 | Anderson | 408/59 |
| 3,153,356 A | * | 10/1964 | Dearborn | 408/59 |
| 5,114,286 A | * | 5/1992 | Calkins | 408/226 |
| 5,988,953 A | * | 11/1999 | Berglund et al. | 408/1 R |
| 6,059,492 A | * | 5/2000 | Hecht | 408/144 |
| 6,276,879 B1 | * | 8/2001 | Hecht | 409/234 |
| 6,582,164 B1 | * | 6/2003 | McCormick | 408/226 |
| 6,682,275 B1 | * | 1/2004 | Lindblom et al. | 408/59 |
| 2002/0009340 A1 | * | 1/2002 | Nagel | 408/144 |
| 2002/0172569 A1 | * | 11/2002 | Nakamura | 408/144 |

FOREIGN PATENT DOCUMENTS

| | | | |
|---|---|---|---|
| JP | 2002-295789 | | 10/2002 |
| JP | 2004255533 A | * | 9/2004 |

* cited by examiner

*Primary Examiner*—Boyer D. Ashley
*Assistant Examiner*—Sara Addisu
(74) *Attorney, Agent, or Firm*—Schweitzer Cornman Gross & Bondell LLP

(57) ABSTRACT

A deep hole cutter for a gun drill system includes a tool shank and a cutting head with two or more cutting edges. The tool shank and the cutting head are separate members connected strongly by threads. The shavings produced by the cutting edges can be discharged together with the coolant supplied through the hole cutter. The shaving dischargeability is improved for higher cutting efficiency.

The tool shank 1 has one outer axial discharge groove 3. The cutting head 2 has one outer axial discharge groove 6 in linear alignment with the discharge groove 3. The cutting head 2 also has a discharge port 7a formed in its front end. The cutting head 2 further has a bypass passage 7 formed in it and extending between the discharge port 7a and the discharge groove 6. The cutting edges 9a and 9c face the discharge groove 6. The cutting edge 9b faces the discharge port 7a.

8 Claims, 12 Drawing Sheets

DEEP HOLE CUTTER

BACKGROUND OF THE INVENTION

1. Field of the Invention

The present invention relates to a deep hole cutter such as a drill for application to a gun drill system.

2. Description of the Related Art

Gun drill systems, BTA systems, ejector systems, etc. are known as deep hole cutting systems. In general, gun drill systems that are simple in structure are used to cut deep holes that are relatively small in diameter.

Figure 12:
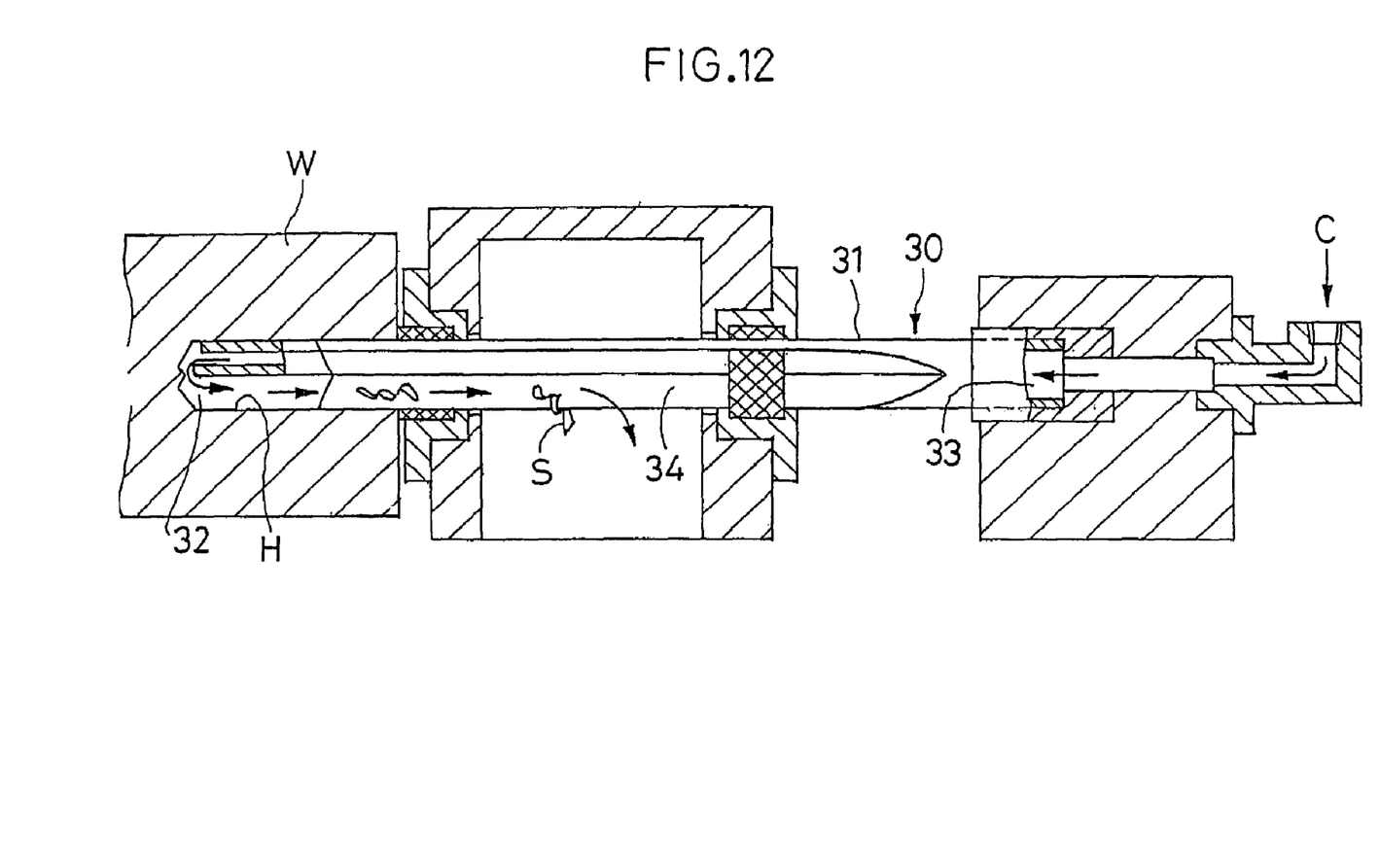
FIG. 12 is a schematic axial section of a gun drill system.

As shown in FIG. 12, a gun drill system includes a gun drill 30 consisting of a tubular tool shank 31 and a drill head 32. The tool shank 31 has an outer axial discharge groove 34 V-shaped in radial section. The drill head 32 is fixed to the front end of the tool shank 31. The interior of the tubular shank 31 serves as a supply passage 33. While the gun drill 30 is cutting a deep hole H in a work W, it produces shavings S in the hole H. In the meantime, a high pressure coolant C is supplied through the supply passage 33 and discharged from the front end of the drill head 32 so as to expel the shavings S through the discharge groove 34. Even if the gun drill 30 is small in diameter, the discharge groove 34 can be large in radial section so that the shavings S are relatively easy to discharge.

Figure 13:
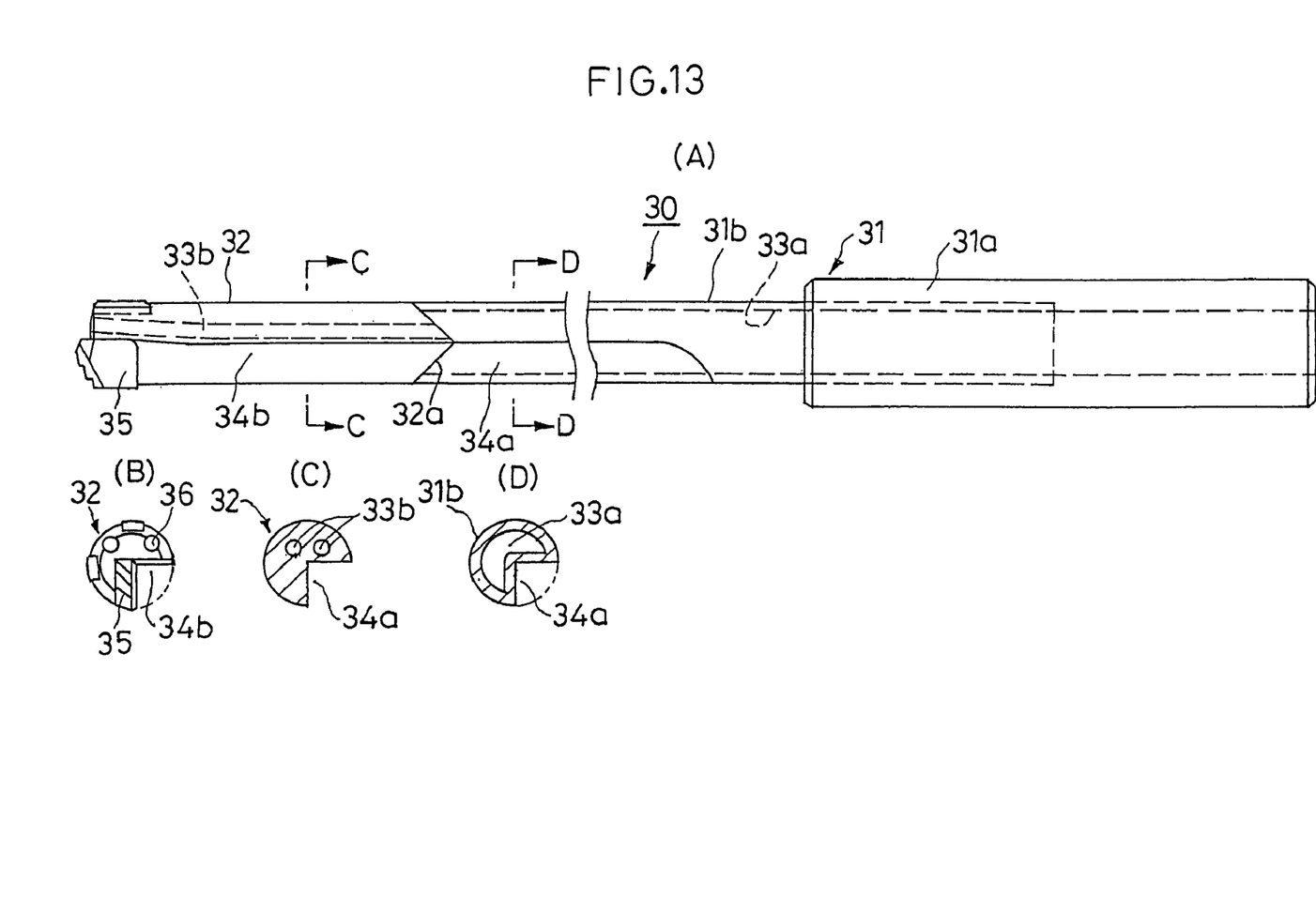
FIG. 13(A) is a side view of a conventional gun drill.
FIG. 13(B) is a front end view of this gun drill.
FIG. 13(C) is a radial section taken along line C—C of FIG. 13(A).
FIG. 13(D) is a radial section taken along line D—D of FIG. 13(A).

FIG. 13 shows a generally known gun drill 30 of the foregoing type, which consists of a tool shank 31 and a drill head 32. The tool shank 31 consists of a cylindrical driver 31*a* and a tubular shaft 31*b*. The cylindrical driver 31*a* is held by a chuck (not shown) or the like to be rotated. The tubular shaft 31*b* is made of pipe material having a relatively thin wall, and its root is fixed in the cylindrical driver 31*a*. A front part of the tubular shaft 31*b* has an outer axial discharge groove 34*a* formed by die molding and V-shaped in radial section. The drill head 32 is made of steel, which is ground so that an outer discharge groove 34*b* similar to the discharge groove 34*a* is formed along its length. A carbide tip 35 is brazed to the front end of the drill head 32. The cutting edge of the carbide tip 35 extends along the front end of the trailing side of the V-shaped groove 34*b*. The drill head 32 has two axial supply bores 33*b* formed through it and communicating with the supply passage 33*a* of the tool shank 31. The drill head 32 also has two outlet ports 36 formed in its front end and each communicating with one of the supply bores 33*b*. The drill head 32 may be replaced with another drill head the whole of which is made of tool steel, and the front end of which is ground to be formed with a cutting edge. The drill head 32 may be replaced with still another drill head to which a carbide tip is screwed. The front end of the tubular shaft 31*b* is notched or recessed in the form of the letter V. The rear end 32*a* of the drill head 32 protrudes in the form of the letter V. These ends are engaged and brazed together so that the tool shank 31 and the drill head 32 are fixed together.

If the carbide tip 35 is worn or broken, it is necessary to replace the whole drill 30 inclusive of the tool shank 31, so that the costs of the drill are high. For rearrangement, it takes a long time to replace the long drill 30, so that the working efficiency is low. When the carbide tip 35 is worn, it is not easy, but costly to regrind the tip. In order to ream a hole drilled by the gun drill 30, it is necessary to provide a reamer including a reamer head, which is fixed to the front end of a tool shank 31. This makes the costs even higher.

In view of the foregoing, the applicant proposed, in Japanese Patent Application No. 2002-295789, a deep hole cutter consisting of a tubular tool shank and a detachable cutting head. The interior of the tubular shank serves as a coolant supply passage. The tool shank has an outer axial discharge groove V-shaped in radial section. The cutting head is screwed detachably into the front end of the tool shank.

Figure 9:
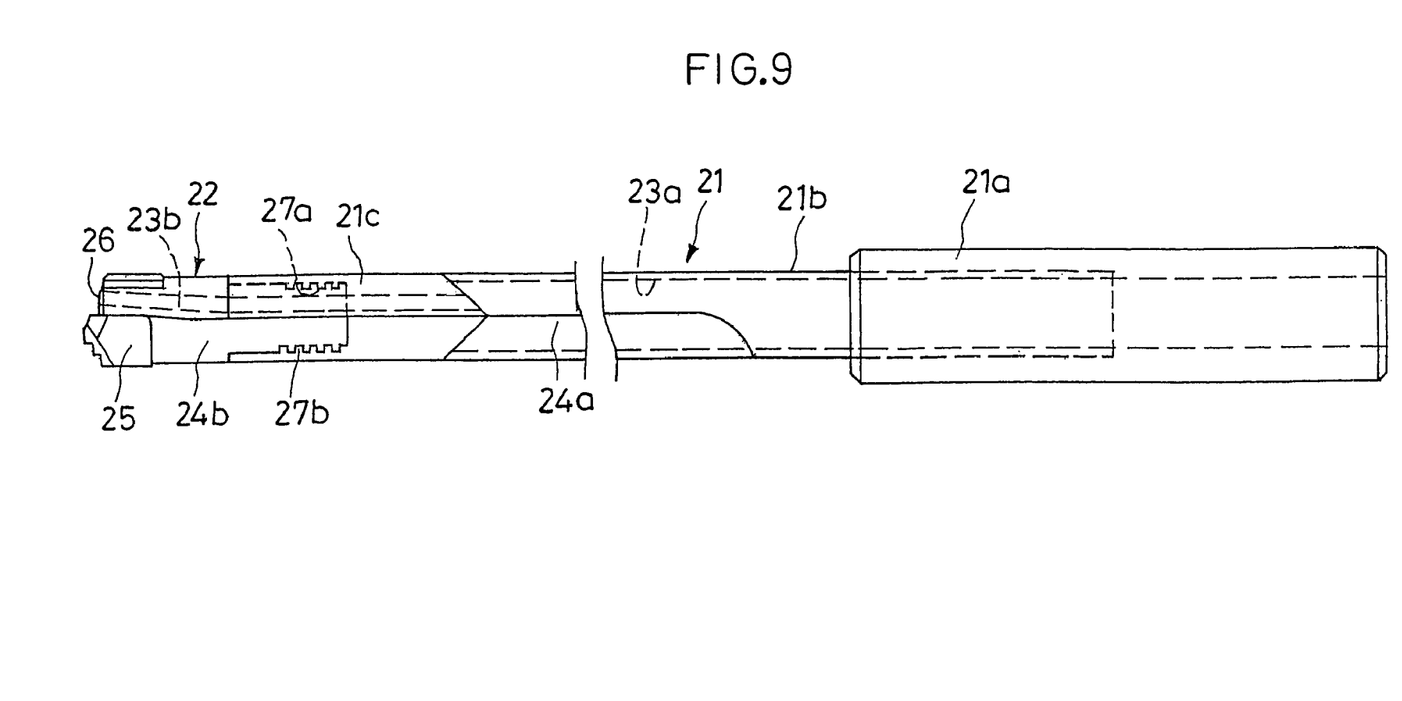
FIG. 9 is a side view of a prior art gun drill with a replaceable cutting head.

FIG. 9 shows a deep hole cutter according to the applicant's proposal, which consists of a tool shank 21 and a cutting head 22. The tool shank 21 consists of a cylindrical driver 21*a*, a tubular shaft 21*b* made of pipe material and a connector 21*c*, which consists of a rear part and a tubular front part. The root of the tubular shaft 21*b* is fixed in the cylindrical driver 21*a*. The rear end of the connector 21*c* is fixed to the front end of the tubular shaft 21*b*. The interior the cylindrical driver 21*a* and tubular shaft 21*b* serves as a coolant supply passage 23*a*. The rear part of the connector 21*c* has two axial bores formed through it, one of which is shown, and which communicate with the supply passage 23*a*. The tool shank 21 has an outer axial discharge groove 24*a* V-shaped in radial section. The discharge groove 24*a* extends along a front part of the tubular shaft 21*b* and the whole length of the connector 21*c*.

The tubular front part of the connector 21*c* has a female thread 27*a* formed at its bottom. The discharge groove 24*a* extends across the female thread 27*a*.

As shown in FIGS. 9 and 10(A)–10(D), the cutting head 22 has a male thread 27*b* formed at its root, two axial supply bores 23*b* formed through it, an outer discharge groove 24*b* formed along its length, a carbide tip 25 fixed to its front end and two outlet ports 26 formed in its front end. The male thread 27*b* engages with the female thread 27*a* of the connector 21*c*. Each supply bore 23*b* communicates with one of the supply bores of the connector 21*c* when the cutting head 22 is connected with the connector 21*c*. The discharge groove 24*b* is V-shaped in radial section and extends across the male thread 27*b*. The discharge groove 24*b* is aligned with the discharge groove 24*a* of the tool shank 21 when the cutting head 22 is connected with the connector 21*c*. The cutting edge of the carbide tip 25 extends along the front end of the trailing side of the discharge groove 24*b*. Each outlet port 26 is the front end of one of the communicating bores 23*b*.

If the carbide tip 25 is worn or broken, it is possible to replace only the cutting head 22 so as to keep using the tool shank 21. This greatly reduces the costs of the hole cutter in comparison with the hole cutter of which the cutting head is fixed to the tool shank. For rearrangement, it is possible to replace only the cutting head 22 by unscrewing it from the connector 21*c* and screwing a new cutting head into the connector 21*c*. The replacement can be done simply in a short time so that the production efficiency can be improved. When the carbide tip 25 is worn, it is possible to regrind or replace the tip easily by detaching only the cutting head 22. If it is necessary to switch from drilling to reaming or another cutting operation, only an appropriate cutting head can be provided for the operation. This reduces the part/component costs of the hole cutter and makes it possible to replace the cutting head 22 easily in a short time.

Drills each having a plurality of cutting edges are used widely as oil hole tools for cutting holes that are relatively large in diameter. The cutting edges of each of the drills are formed on its diametrically opposite sides at its front end. The cutting edge or edges on one of the sides face in one direction, and that or those on the other side face in the opposite direction. If a gun drill system includes a cutting head having such cutting edges, it needs to have outer axial discharge grooves for efficiently discharging shavings while it is drilling a hole. The discharge grooves are V-shaped in radial section and each extend on one of diametrically opposite sides of the cutting head and tool shank.

Figure 10:
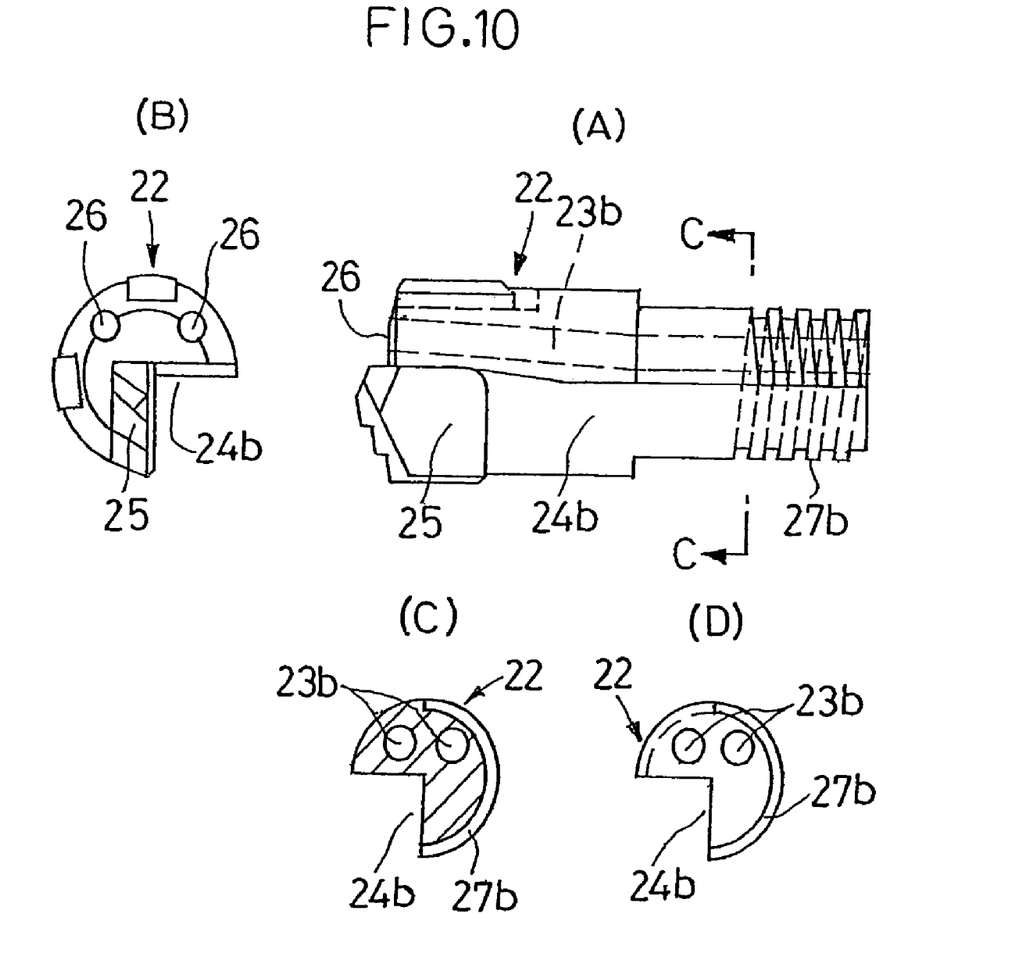
FIG. 10(A) is a side view of the drill head of the prior art gun drill.
FIG. 10(B) is a front end view of the drill head.
FIG. 10(C) is a radial section taken along line C—C of FIG. 10(A).
FIG. 10(D) is a rear end view of the drill head.

The deep hole cutter shown in FIGS. 9 and 10 might have outer axial discharge grooves formed on diametrically opposite sides of its tool shank 21 and cutting head 22. These discharge grooves would, however, reduce the threads 27a and 27b in area, greatly lowering the strength of the connection between the tool shank 21 and cutting head 22, so that the connection could not withstand cutting loads.

Figure 11:
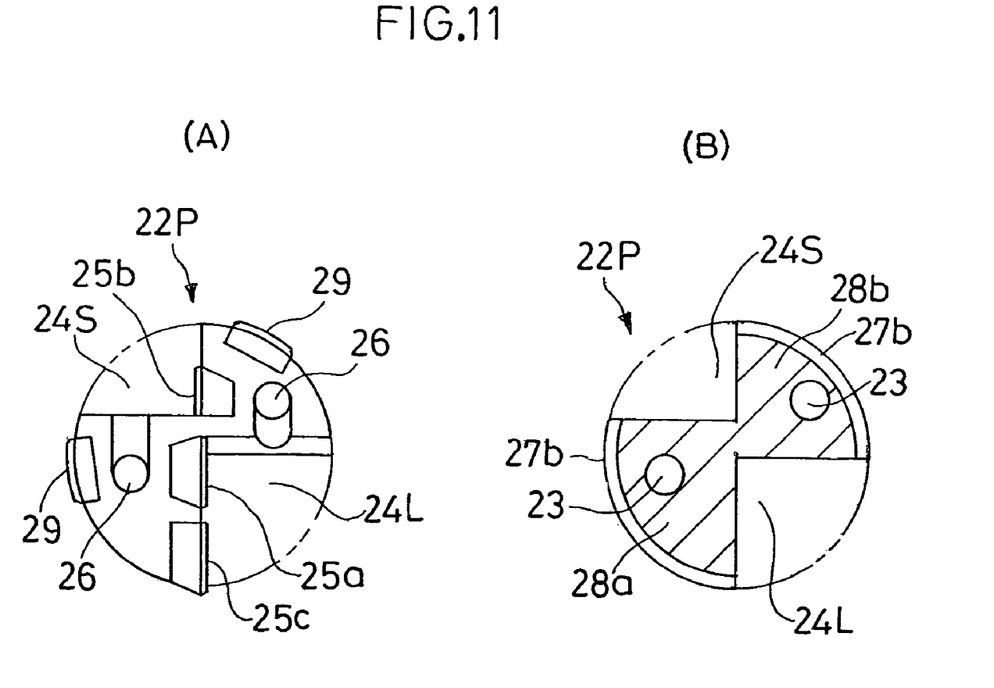
FIG. 11(A) is a front end view of the cutting head of the hole cutter.
FIG. 11(B) is a radial section of the root of the cutting head.

FIGS. 11(A) and 11(B) show an assumed structure of a deep hole cutter for application to a gun drill system. This hole cutter consists of a cutting head 22P and a tool shank (not shown). The cutting head 22P can be screwed detachably into the tool shank and has three cutting edges. FIG. 11(A) is a front end view of the cutting head 22P. FIG. 11(B) is a radial section of the root of the cutting head 22P. The cutting head 22P has a large outer discharge groove 24L and a small outer discharge groove 24S that are V-shaped in radial section. The discharge grooves 24L and 24S are formed on diametrically opposite sides of the cutting head 22P and extend along its whole length. The cutting head 22P is fitted with a central tip 25a, an intermediate tip 25b and a peripheral tip 25c on its front end. The cutting edges of the central and peripheral tips 25a and 25c extend along the front end of the trailing side of the large discharge groove 24L. The cutting edge of the intermediate tip 25b extends along the front end of the trailing side of the small discharge groove 24S. The cutting head 22P also has two coolant supply bores 23 each formed axially through one of its parts 28a and 28b that are nearly fan-shaped in radial section between the discharge grooves 24L and 24S. The cutting head 22P further has two outlet ports 26 formed in its front end, each of which is the front end of one of the supply bores 23. Each of the fan-shaped parts 28a and 28b is fitted with a guide pad 29 on its peripheral surface.

As shown in FIG. 11(B), the cutting head 22P has a male thread 27b formed at its root for engagement with the female thread of the tool shank (not shown). The male thread 27b is interrupted by the discharge grooves 24L and 24S and separated into two groups on the fan-shaped parts 28a and 28b. Moreover, the sum of the circumferential lengths of the fan-shaped parts 28a and 28b is only slightly larger than ½ of the whole circumference of the cutting head 22P. This is also the case with the female thread of the tool shank. Accordingly, the screw connection between the cutting head 22P and the tool shank is very weak in strength, so that cutting loads are liable to break, bend, twist or otherwise deform the connection.

SUMMARY OF THE INVENTION

In view of the foregoing, the primary object of the present invention is to provide a deep hole cutter including a tool shank and a cutting head with two or more cutting edges, the tool shank and the cutting head being separate members connected strongly by threads or the like, the hole cutter being high in shaving dischargeability so as to be high in cutting efficiency.

A deep hole cutter according to the present invention comprises a tool shank and a cutting head. The tool shank includes a front connecting part at its front end. The cutting head includes a rear connecting part at its rear end. The two connecting parts can be connected together coaxially and detachably. The tool shank has a coolant supply passage formed longitudinally in it. The tool shank also has one outer discharge groove formed longitudinally of it and V-shaped in radial section. The cutting head has a coolant supply bore formed in it, which communicates with the supply passage when the cutting head is connected to the tool shank. The cutting head further has one outer discharge groove V-shaped in radial section. When the cutting head is connected to the tool shank, their discharge grooves are aligned linearly with each other. The cutting head further has a discharge port formed in its front end substantially diametrically opposite its discharge groove. The discharge port opens in the peripheral surface of the cutting head. The cutting head further has a bypass passage formed in it between the discharge port and its discharge groove. The cutting head further has a plurality of cutting edges formed on its front end. At least one of the cutting edges faces the discharge groove of the cutting head. At least one other of the cutting edges faces the discharge port. The cutting head further has two outlet ports formed in its front end substantially diametrically opposite each other and communicating with the supply bore.

Because each of the outer V-shaped discharge grooves of the tool shank and the cutting head is single, only one section in radial section is cut from the associated connecting part so that about ¾ of the connecting part can circumferentially continue. This makes the connecting parts strong enough to withstand cutting loads, so that they may hardly break, bend, twist or otherwise deform while the gun drill is drilling a hole. The shavings produced by the cutting edge facing the single discharge groove of the cutting head are discharged directly through the discharge grooves together with the coolant discharged from the outlet ports. In the meantime, the shavings produced by the cutting edge facing the discharge port flow together with the coolant through this port and the bypass passage into the discharge groove of the cutting head and are discharged through the discharge grooves. This makes the gun drill high in shaving dischargeability, thereby making it high in cutting efficiency.

The other objects of the present invention will become apparent from the following descriptions.

BRIEF DESCRIPTION OF THE DRAWINGS

FIGS. 8(A) and 8(B) show another embodiment of the connection between the cutting head and the tool shank.

FIGS. 11(A) and 11(B) show an assumed structure of a deep hole cutter for application to a gun drill system.

Preferred embodiments of the present invention will be described below in detail with reference to the accompanying drawings.

DETAILED DESCRIPTION OF THE PREFERRED EMBODIMENTS

Figure 1:
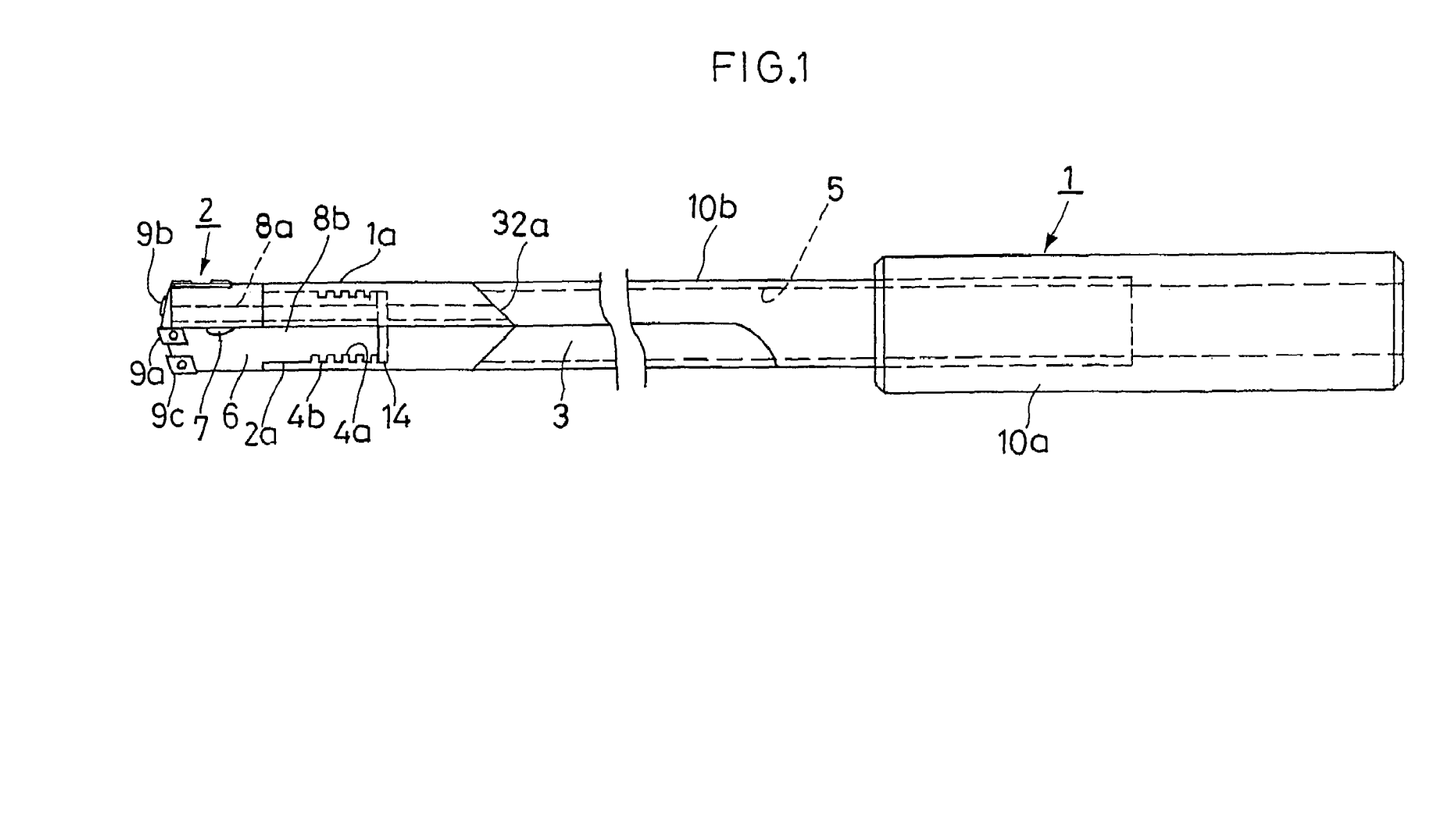
FIG. 1 is a side view of a gun drill according to a first embodiment of the present invention.

FIGS. 1–4 show a gun drill according to a first embodiment of the present invention. As shown in FIG. 1, this gun drill consists of a tool shank 1 and a cutting head 2, which are coaxial with each other. The root of the cutting head 2 is screwed detachably into the front end of the tool shank 1.

The tool shank 1 consists of a cylindrical driver 10a, a tubular shaft 10b and a connector 1a, which consists of a rear part and a tubular front part. The cylindrical driver 10a is held by a chuck or the like to be rotated. The tubular shaft 10b is made of pipe material, and its root is fixed in the cylindrical driver 10a. The tubular shaft 10b has a V-shaped notch 32a formed in its front end, to which the rear end of the connector 1a is welded. The tubular front part of the connector 1a has a female square thread 4a formed near its bottom. The tool shank 1 has an outer axial discharge groove 3 V-shaped or fan-shaped in radial section. Both sides of the discharge groove 3 make an angle of about 90 degrees with each other and meet each other about the center of the tool shank 1. The discharge groove 3 extends along a front part of the tubular shaft 10b and the whole length of the connector 1a. The discharge groove 3 in the tubular shaft 10b is formed by die molding and has the same radial section as shown in FIG. 13(D). The discharge groove 3 in the connector 1a is formed by cutting out about ¼ of the connector in radial section. The interior of the cylindrical driver 10a and the interior of the tubular shaft 10b communicate with each other and form a coolant supply passage 5, which does not communicate with the discharge groove 3. The rear part of the connector 1a has two axial bores formed through it, one of which is shown, and which communicate with the supply passage 5.

As shown in detail in FIGS. 2(A)–2(C), the cutting head 2 includes a connecting root 2a, which has a diameter for tight or close engagement with the connector 1a of the tool shank 1. The connecting root 2a is smaller in diameter than the front part of the cutting head 2, so that the rear end of the front part is formed with a peripheral step 2c. The connecting root 2a has a male square thread 4b formed on its rear end part for engagement with the female thread 4a of the connector 1a. The cutting head 2 has an outer axial discharge groove 6 formed along its whole length and V-shaped in radial section. The front end 2b of the cutting head 2 has a discharge port 7a formed in it nearly diametrically opposite the discharge groove 6. The cutting head 2 also has a bypass passage 7 formed in it, which communicates with the discharge port 7a. The rear end 7b of the bypass passage 7 communicates with the discharge groove 6. The cutting head 2 further has two axial coolant supply bores 8a and 8b formed through it and nearly diametrically opposite each other. The supply bore 8a extends near the leading side of the discharge groove 6. The front end of the other bore 8b is positioned near the leading side of the discharge port 7a. The supply bores 8a and 8b do not meet the discharge groove 6 and the bypass passage 7.

The front end 2b of the cutting head 2 is fitted with a central carbide tip 9a, an intermediate carbide tip 9b and a peripheral carbide tip 9c that are screwed to it. The cutting edges of the central tip 9a and peripheral tip 9c extend along the front end of the trailing side of the discharge groove 6. The cutting edge of the intermediate tip 9b extends along the trailing side of the discharge port 7a. The cutting edges of the tips 9a and 9c and the cutting edge of the tip 9b face in opposite directions. The front end 2b is also fitted with two guide pads 13 fixed to its periphery, each off one side of the discharge port 7a and away from the discharge groove 6. The front end 2b also has two outlet ports 80a and 80b formed in it as the front ends of the supply bores 8a and 8b, respectively. The front end 2b further has two coolant guide recesses 81 formed in it. One of the guide recesses 81 connects the outlet port 80a with the front end 6a of the discharge groove 6. The other guide recess 81 connects the outlet port 80b with the discharge port 7a. One of the guide recesses 81 might be omitted. The supply bore 8a associated with the discharge groove 6 is larger in diameter than the supply bore 8b associated with the discharge port 7a.

Figure 2:
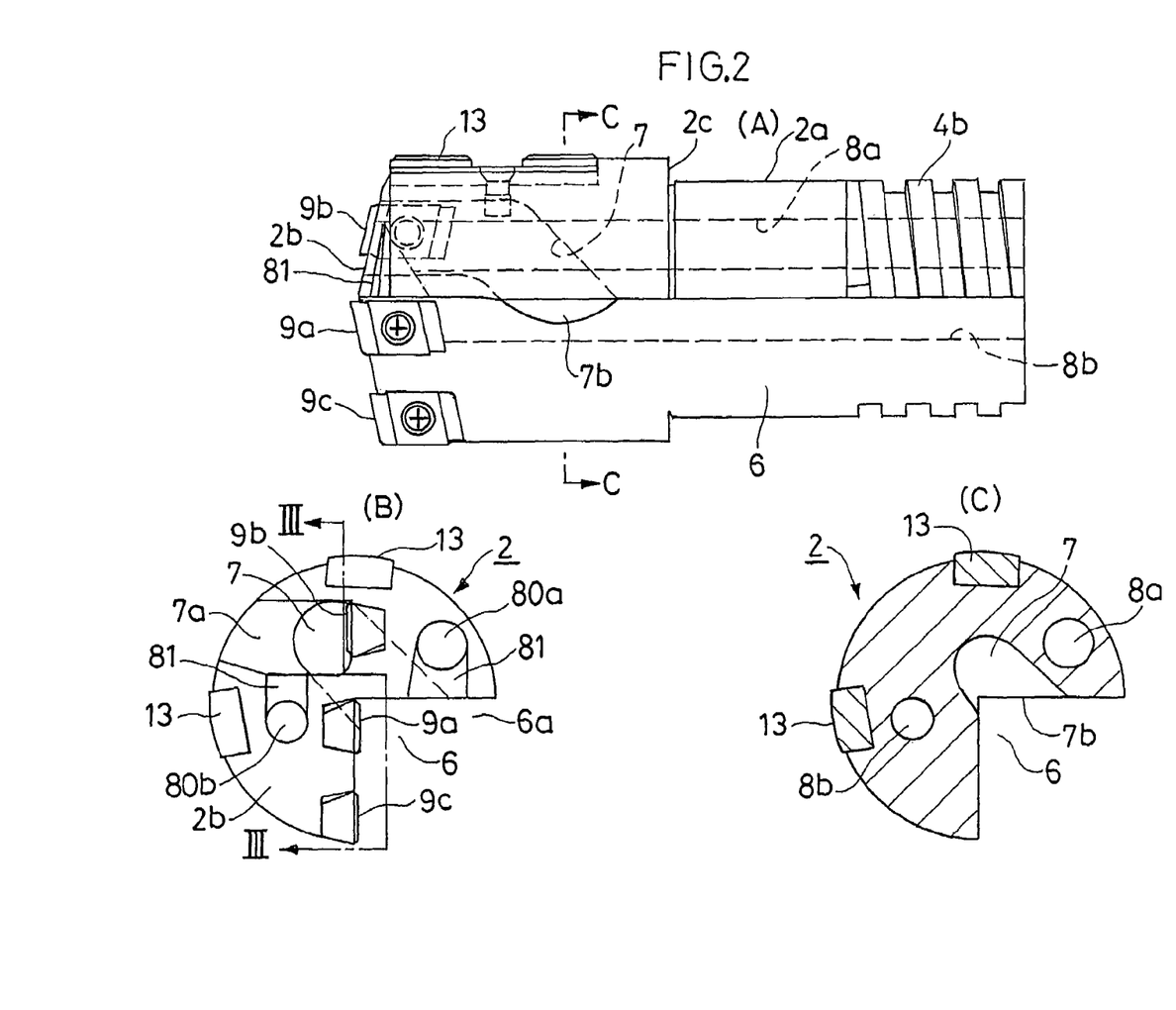
FIG. 2(A) is a side view of the cutting head of the gun drill according to the first embodiment.
FIG. 2(B) is a front end view of the cutting head.
FIG. 2(C) is a radial section taken along line C—C of FIG. 2(A).
Figure 3:
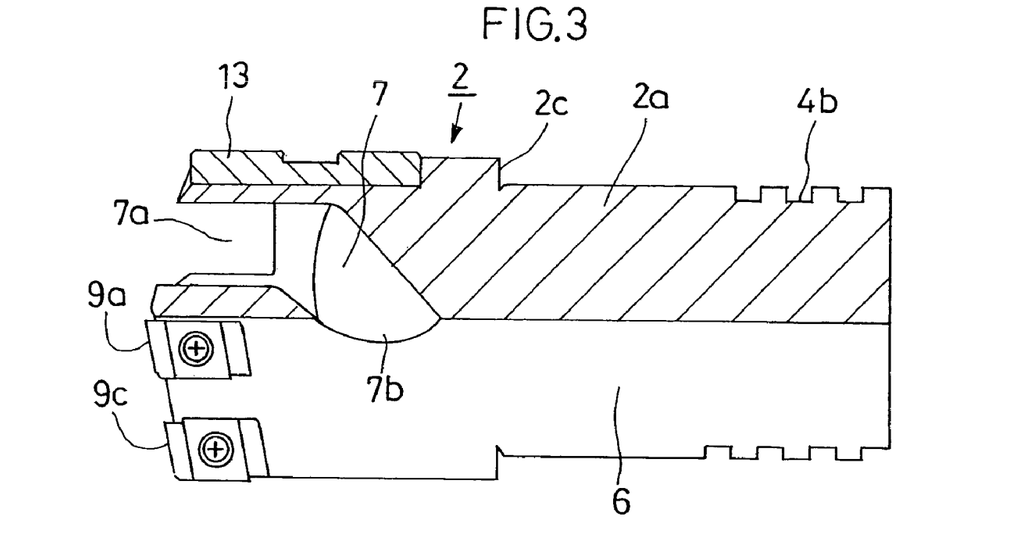
FIG. 3 is an axial section taken along line III—III of FIG. 2(B).
Figure 4:
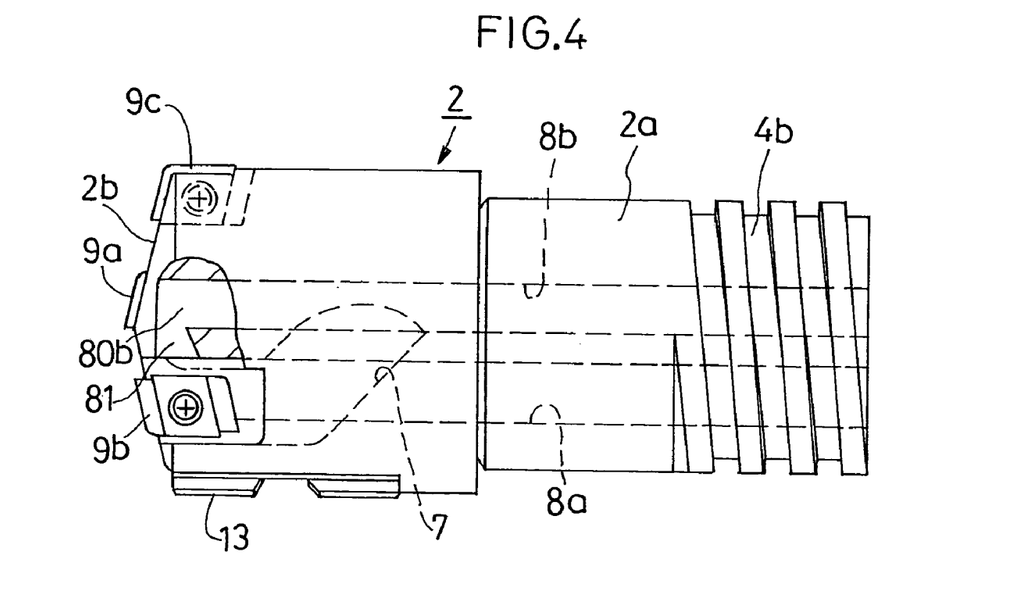
FIG. 4 is another side view of the cutting head as viewed on the other side than FIG. 2(A).

As shown in FIGS. 1 and 2, when the connecting root 2a of the cutting head 2 engages with the connector 1a of the tool shank 1, with the peripheral step 2c (FIG. 2(A)) in close contact with the front end of the connector 1a, the discharge grooves 6 and 3 communicate in linear alignment with each other, and each of the supply bores 8a and 8b communicates with one of the supply bores of the connector 1a. The front end part of the connector 1a that is forward of the female thread 4a is an outer pilot. The part of the cutting head 2 that is positioned between the peripheral step 2c and the male thread 4b is an inner pilot. The outer and inner pilots are equal in length, and the inner and outer diameters of the outer and inner pilots, respectively, are nearly equal. Accordingly, the connecting root 2a can engage with the connector 1a smoothly and coaxially with accuracy.

It is preferable that the radial bottom surface of the tubular front part of the connector 1a be flat for close contact with the rear end surface of the connecting root 2a of the cutting head 2. In practice, however, the tubular part of the connector 1a is difficult to tap or thread in such a manner that its radial bottom surface can be flat. Therefore, as shown in FIG. 1, the tubular part of the connector 1a is fitted with a metal insert 14 brazed or otherwise fixed to its bottom to fill the space inside its unthreaded bottom portion.

The discharge grooves 3 and 6 are formed on only one side of the tool shank 1 and cutting head 2, and interrupt about ¼ of the circumference of the threads 4a and 4b, so that the threads extend over about ¾ of the circumference of the gun drill. Accordingly, the thread connection between the tool shank 1 and cutting head 2 is strong enough to withstand cutting loads, so that the connection may hardly break, bend, twist or otherwise deform while the gun drill is drilling a hole. The shavings produced by the central and peripheral tips 9a and 9c are discharged directly through the single discharge groove 6 of the cutting head 2 and the discharge groove 3 of the tool shank 1 together with the coolant discharged from the outlet port 80a. The shavings produced by the intermediate tip 9b are discharged through the discharge port 7a, the bypass passage 7 and the discharge grooves 6 and 3 together with the coolant discharged from the outlet port 80b. Accordingly, the gun drill can well discharge the shavings, so that its cutting efficiency is high.

As stated above, the guide recesses 81 in the front end 2b of the cutting head 2 connect the outlet ports 80a and 80b with the discharge groove 6 and the discharge port 7a, respectively. Consequently, the coolant discharged at the front end 2b of the cutting head 2 can be distributed uniformly to the discharge groove 6 and the bypass passage 7. This makes it possible to efficiently discharge the shavings produced by the carbide tips 9a–9c. The cutting edges of the central and peripheral tips 9a and 9c face the discharge groove 6. The cutting edge of the intermediate tip 9b faces the discharge port 7a, which communicates with the bypass passage 7. Consequently, the large number of shavings produced by the central and peripheral tips 9a and 9c flow directly into the discharge groove 6, while the relatively small number of shavings produced by the intermediate tip 9b flow through the discharge port 7a into the bypass passage 7. The curved discharge passage including the bypass passage 7 is high in flow resistance and lower in shaving dischargeability. This balances the quantity of shavings flowing into the discharge groove 6 and bypass passage 7, which differ in shaving dischargeability. As a result, the gun drill is high in shaving dischargeability.

The square threads 4a and 4b give high connecting strength to the thread connection between the tool shank 1 and cutting head 2. Gaps are hardly made between the square threads 4a and 4b, so that the coolant is prevented from leaking through the thread connection. The insert 14 fills the bottom gap in the tubular front part of the connector 1a so that the rear end face of the connecting root 2a can be in close contact with the bottom of the tubular part. This more reliably prevents the coolant from leaking.

If the cutting edges of the carbide tips 9a–9c are worn or broken, it is necessary to replace only the cutting head 2. For rearrangement, it is necessary to replace only the cutting head 2 by unscrewing it from the tool shank 1. This simplifies the operation, shortens the operating time and improves the production efficiency. When the cutting edges are worn, it is possible to replace the cutting head 2 easily by detaching the head from the tool shank 1. In order to switch from drilling to reaming or another cutting operation, it is necessary to provide only an appropriate cutting head. This reduces the part/component costs of the gun drill and makes it possible to replace the cutting head 2 easily in a short time.

Figure 5:
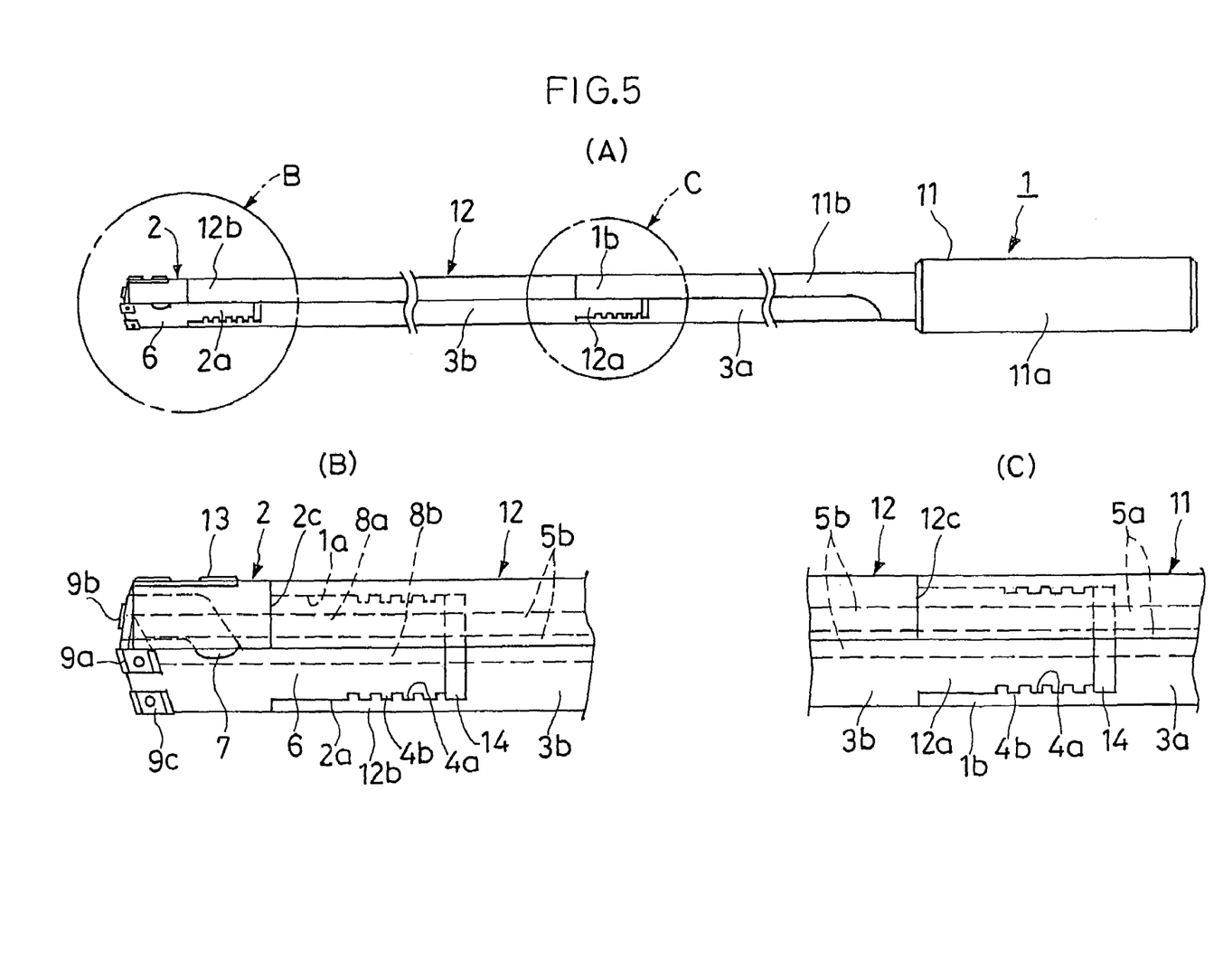
FIG. 5(A) is a side view of a gun drill according to a second embodiment of the present invention.
FIG. 5(B) is an enlarged view of the part in circle B of FIG. 5(A).
FIG. 5(C) is an enlarged view of the part in circle C of FIG. 5(A).
Figure 6:
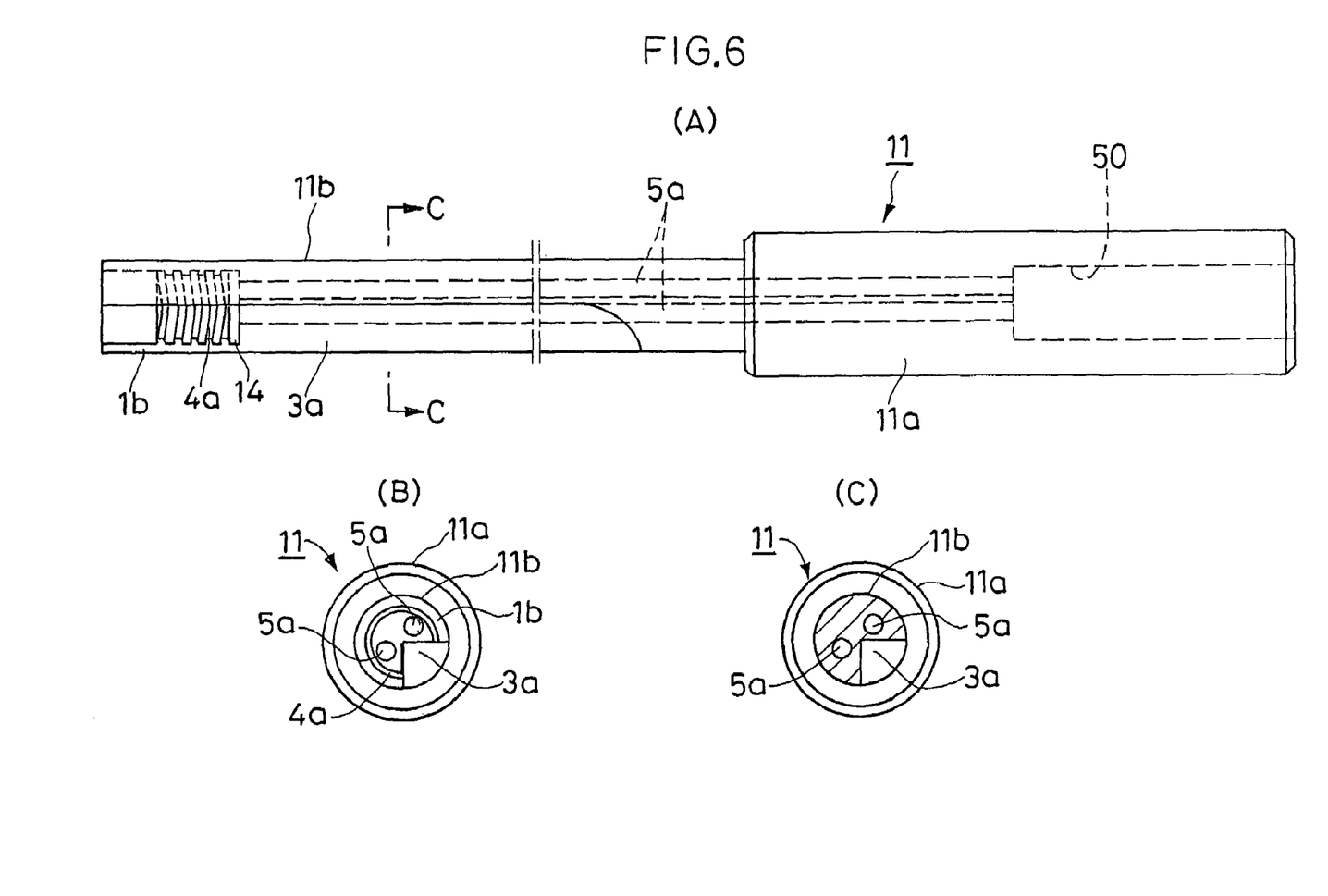
FIG. 6(A) is a side view of the shank body of the gun drill according to the second embodiment.
FIG. 6(B) is a front end view of the shank body.
FIG. 6(C) is a radial section taken along line C—C of FIG. 6(A).
Figure 7:
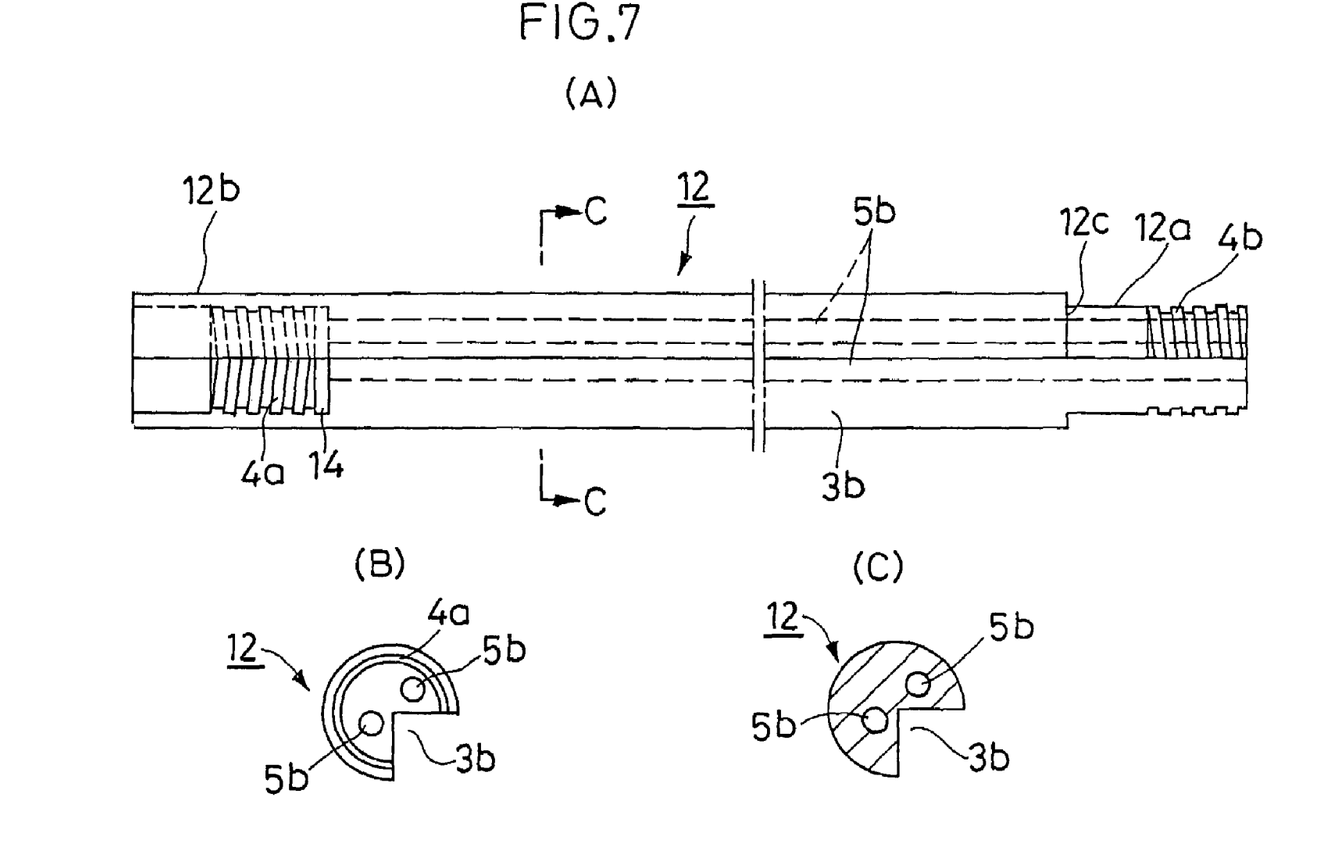
FIG. 7(A) is a side view of the connecting shaft of the gun drill according to the second embodiment.
FIG. 7(B) is a front end view of the connecting shaft.
FIG. 7(C) is a radial section taken along line C—C of FIG. 7(A).

FIGS. 5–7 show a gun drill according to a second embodiment of the present invention. As shown in FIG. 5(A), this gun drill consists of a cutting head 2 and a tool shank 1, which consists of a shank body 11 and a connecting shaft 12. The cutting head 2 is similar in structure to that of the first embodiment and accordingly will not be described. The components of the two cutting heads are assigned the same reference numerals.

As shown in detail in FIGS. 6(A)–6(C), the shank body 11 consists of a large diameter driver 11a and a small diameter driving shaft 11b, which is circular in radial section. The driver 11a is held by a chuck (not shown) or the like to be rotated. The rear end of the driving shaft 11b is fixed to the front end of the driver 11a coaxially with it. The driving shaft 11b has an outer axial discharge groove 3a V-shaped or fan-shaped in radial section. The discharge groove 3a extends between its front end and a point forward of the driver 11a. The driving shaft 11b includes a tubular connecting part 1b at its front end, which is similar to the tubular front part of the connector 1a of the first embodiment. The connecting part 1b has a female square thread 4a formed near its bottom. As shown in FIGS. 6(B) and 6(C), both sides of the discharge groove 3a make an angle of about 90 degrees with each other and meet each other about the center of the driving shaft 11b. The discharge groove 3a is formed by cutting out about ¼ of the driving shaft 11b in radial section. The driver 11a has a central bore 50 formed between its rear end and its middle. The driver 11a and driving shaft 11b have two axial coolant supply bores 5a formed through them and extending between the bottoms of the central bore 50 and connecting part 1b without meeting the discharge groove 3a.

The connecting shaft 12 is circular in radial section and equal in diameter to the driving shaft 11b. As shown in detail in FIGS. 7(A)–7(C), the connecting shaft 12 includes a connecting root 2a at its rear end and a tubular connecting part 12b at its front end. The connecting root 12a is smaller in diameter than the front part of the connecting shaft 12, so that the rear end of the front part is formed with a peripheral step 12c. The connecting root 12a has a diameter for close engagement with the tubular connecting part 1b of the driving shaft 11b. The connecting root 12a has a male square thread 4b formed on a rear part of it for engagement with the female thread 4a of the driving shaft 11b. The tubular connecting part 12b is identical in size and shape to the connecting part 1b of the driving shaft 11b. This connecting part 12b has a female square thread 4a formed near its bottom. The connecting shaft 12 has an outer axial discharge groove 3b V-shaped in radial section. The discharge groove 3b extends along the whole length of the connecting part 12, which includes the connecting root 12a and connecting part 12b. The connecting shaft 12 also has two axial coolant supply bores 5b formed through it and extending between the rear ends of the connecting root 12b and connecting part 12b without meeting the discharge groove 3b.

As shown in FIGS. 5(A) and 5(C), when the connecting root 12a of the connecting shaft 12 engages with the connecting part 1b of the driving shaft 11b, with the peripheral step 12c in close contact with the front end of the driving shaft 10b, the discharge grooves 3b and 3a communicate in linear alignment with each other, and each of the supply bores 5b communicates with one of the supply bores 5a. The connecting roots 12a and 2a of the connecting shaft 12 and cutting head 2, respectively, are identical in size and shape. As shown in FIGS. 5(A) and 5(B), when the connecting root 2a of the cutting head 2 engages with the connecting part 12b of the connecting shaft 12, with the peripheral step 2c in close contact with the front end-of this shaft 12, the discharge grooves 6 and 3b communicate in linear alignment with each other, and each of the supply bores 8a and 8b communicates with one of the supply bores 5b.

Each of the tubular parts 1b and 12b of the shafts 11b and 12 is fitted with a metal insert 14 brazed or otherwise fixed to its bottom to fill the space inside its unthreaded bottom portion. The insert 14 is similar to that of the connector 1a of the first embodiment. The part of the cutting head 2 that is positioned between the peripheral step 2c and the male thread 4b is an inner pilot. The part of each of the connecting roots 12a and 2a that is positioned between the associated peripheral step 12c or 2c and the associated male thread 4b is an inner pilot. The front end part of each of the tubular connecting parts 1b and 12b that is forward of the associated female thread 4a is an outer pilot. The inner and outer pilots are equal in inner pilots, respectively, are nearly equal. Accordingly, the connecting roots 12a and 2a can engage with the connecting parts 1b and 12b, respectively, smoothly and coaxially with accuracy.

As is the case with the first embodiment, the cutting head 2 of this gun drill can well discharge shavings, so that its cutting efficiency is high. As is also the case with that embodiment, the thread connection between the cutting head 2 and connecting shaft 12 is sufficiently strong. The tool shank 1 consists of the shank body 11 and the independent connecting shaft 12. The connecting shaft 12 can be replaced with a connecting shaft having a different length. This makes it possible to use the shank body 11 to cut holes having different depths. Consequently, the component costs of this gun drill are very low in comparison with cases where deep hole cutters are provided that include shanks having different lengths. In general, the torsional stresses on a gun drill due to cutting loads tend to concentrate at a middle portion of its shank. The shank wears down with time mostly at its middle portion. While the gun drill is used, the shank may suddenly break or deform. The sudden breakage or deformation occurs mostly at the middle portion of the shank. Such torsional stresses on the gun drill according to this embodiment concentrate generally on the connecting shaft 12. If the connecting shaft 12 is damaged, it can be replaced, while the shank body 11 can be kept used for a long time. The shank body 11 is hard to damage, but its production costs are high because of its structure and sizes. Thus, the maintenance costs of the gun drill can be greatly reduced.

As described above, the connecting shaft 12 includes a connecting root 12a at its rear end and a tubular connecting part 12b at its front end, which have a male thread 4b and a female thread 4a, respectively. As also described, the tubular connecting parts 1b and 12b of the shank body 11 and connecting shaft 12 are identical in size and shape, and the connecting roots 12a and 2a of the connecting shaft 12 and cutting head 2 are identical in size and shape. This makes it possible to linearly connect two or more such connecting shafts 12 in order to cut extremely long holes. This also makes it possible to connect the cutting head 2 directly to the shank body 11 in order to cut relatively short holes.

For rearrangement, or when the cutting edges of the cutting head 2 are worn or broken, only the head can be replaced, while the shank body 11 and connecting shaft 12 can be kept used, as is the case with the first embodiment. This makes the operation simple and the operating time short, improving the production efficiency. The square threads 4a and 4b give high connecting strength to the thread connections between the connecting shaft 12 and shank body 11 and between the connecting shaft 12 and cutting head 2. Gaps are hardly made between the square threads 4a and 4b, so that the coolant is prevented from leaking through the thread connections. Each insert 14 fills the bottom gap in the tubular connecting part 1b or 12b of the associated shaft 11b or 12 so that the rear end face of the associated connecting root 12a or 2a can be in close contact with the bottom of the connecting part. This more reliably prevents the coolant from leaking.

In the first and second embodiments, the female threads 4a might be replaced by male threads, while the male threads 4b might be replaced by female threads. Both sides of each of the V-shaped discharge grooves 3, 3a, 3b and 6 make an angle of about 90 degrees with each other, but the angle might suitably range between about 90 and 130 degrees. The bottoms of the members 1, 11, 12 and 2 might be round so that middle portions of these members could be thicker for higher strength. In each of the two embodiments, the cutting head 2 is fitted with three carbide tips 9a–9c, but might have two, four or more than four carbide tips. The cutting head 2 might have carbide tips brazed to it in place of the screwed tips 9a–9c. The whole cutting head 2 might be made of tool steel, and its front end might be formed directly with cutting edges.

Figure 8:
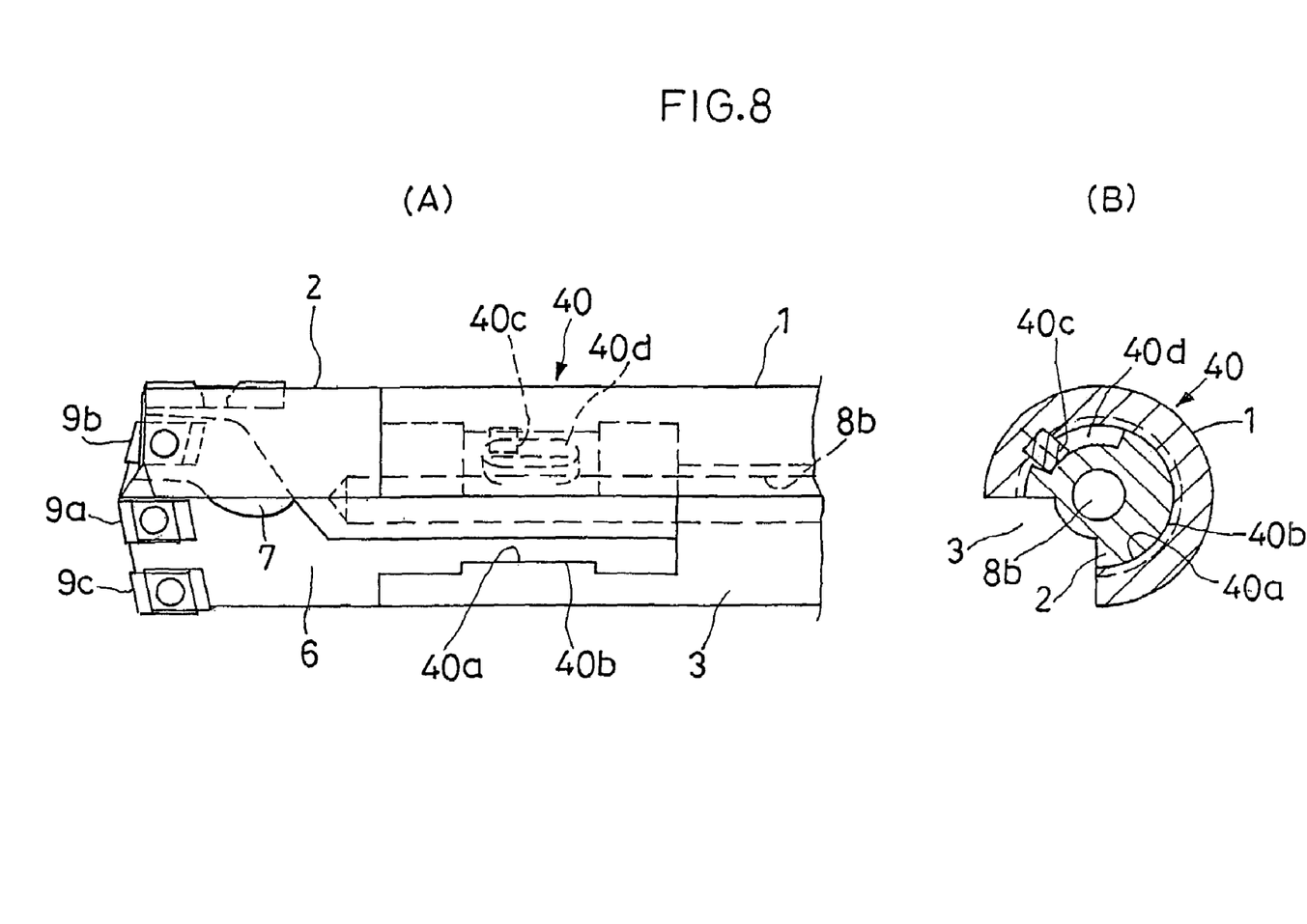
FIG. 8(A) is a partial side view of a gun drill according to a third embodiment of the present invention.
FIG. 8(B) is a radial section of this gun drill.

FIGS. 8(A) and 8(B) show a gun drill according to a third embodiment of the present invention.

In the first embodiment shown in FIGS. 1–4, the cutting head 2 is screwed into the tool shank 1.

As shown in FIGS. 8(A) and 8(B), the gun drill according to this embodiment includes a tool shank 1 and a cutting head 2, which are connected detachably by a connection 40. Each of the cutting head 2 and tool shank 1 has an axial coolant supply bore 8b formed in its center. The cutting head 2 and tool shank 1 have outer axial discharge grooves 6 and 3, respectively, which are roughly V-shaped in radial section. The cutting head 2 is fitted with a central carbide tip 9a, an intermediate carbide tip 9b and a peripheral carbide tip 9c, which are identical with those in the first embodiment. The cutting head 2 also has a discharge port (not shown) formed in it, which is identical with the port 7a in the first embodiment, and which is faced by the intermediate tip 9b. The cutting head 2 further has a bypass passage 7 formed in it, which characterizes the present invention. The bypass passage 7 is identical with that in the first embodiment and extends between the discharge port and discharge groove 6.

The cutting head 2 includes a connecting root, while the tool shank 1 includes a front tubular part. The connection 40 includes a circumferential stage 40a and a circumferential groove 40b. The circumferential stage 40a is formed on the inner peripheral surface of the tubular connecting part. A radial key 40c protrudes from the circumferential stage 40a. The circumferential groove 40b is formed in the connecting root. A key groove 40d is formed in the circumferential groove 40b.

With the discharge grooves 6 and 3 90 degrees out of phase with each other, and with the circumferential stage 40a and circumferential groove 40b in radial alignment with each other, the cutting head 2 and tool shank 1 are turned by about 90 degrees relative to each other on the axis of the gun drill. This engages the circumferential stage 40a and circumferential groove 40b with each other, thereby preventing the cutting head 2 and tool shank 1 from moving axially relative to each other. At the same time, the radial key 40c engages with one edge of the key groove 40d, thereby preventing the cutting head 2 and tool shank 1 from rotating relative to each other. It is thus possible to connect the cutting head 2 and tool shank 1 quickly, easily and detachably at the connection 40.

A deep hole cutter according to the present invention for a gun drill system comprises a tool shank and a cutting head with two or more cutting edges. The tool shank and the cutting head are separate members connected by threads. Each of the tool shank and the cutting head has one outer axial discharge groove in linear alignment with that of the other. The cutting head also has a discharge port formed in its front end. The cutting head further has a bypass passage formed in it and extending between the discharge port and its discharge groove. At least one of the cutting edges faces the discharge groove of the cutting head. At least one other of the cutting edges faces the discharge port. The tool shank and the cutting head are connected strongly. The shavings produced by the cutting edges can be discharged together with coolant. The shaving dischargeability is improved for higher cutting efficiency.

The cutting head also has a first coolant outlet port and a second coolant outlet port both formed in its front end. The first and second outlet ports may be adjacent to the leading sides of the discharge groove of the cutting head and the discharge port, respectively. The cutting head may further have a first coolant guide recess and a second coolant guide recess both formed in its front end. The first guide recess extends between the front end of the discharge groove of the cutting head and the first outlet port. The second guide recess extends between the discharge port and the second outlet port. Accordingly, the coolant discharged at the front end of the cutting head can be distributed evenly to the discharge groove of the cutting head and the bypass passage. It is consequently possible to efficiently discharge the shavings produced by the cutting edges, which face the discharge groove of the cutting head and the discharge port.

The cutting edges may be a central cutting edge, a peripheral cutting edge and an intermediate cutting edge. The central and peripheral cutting edges are adjacent to the discharge groove of the cutting head. The intermediate cutting edge is adjacent to the discharge port. This balances the quantity of shavings flowing into the discharge groove of the cutting head and the bypass passage, which differ in shaving dischargeability. As a result, the hole cutter is high in shaving dischargeability.

The tool shank may comprise a shank body and a connecting shaft. The shank body includes a front threaded connecting part at its front end. The connecting shaft includes a rear threaded connecting part at its rear end for coaxial and detachable connection with the front connecting part of the shank body. The connecting shaft also includes a front threaded connecting part at its front end. The cutting head includes a rear threaded connecting part at its rear end for coaxial and detachable connection with the front connecting part of the connecting shaft. The connecting shaft can be replaced by a connecting shaft with a different length so that the proper shank length can be selected for the depth of a hole that should be cut by the hole cutter. This greatly reduces the component costs of the hole cutter in comparison with cases where tool shanks with different lengths are provided. When the connecting shaft has worn down with time, or if it suddenly breaks or deforms while the hole cutter is used, it can be replaced, so that the shank body can be kept used. This greatly reduces the maintenance costs of the hole cutter in comparison with the replacement of the whole tool shank.

The front threaded connecting parts of the shank body and the connecting shaft may be identical in size and shape. The rear threaded connecting parts of the connecting shaft and the cutting head may be identical in size and shape. This makes it possible to linearly connect two or more such connecting shafts in order to cut extremely long holes. This also makes it possible to connect the cutting head directly to the shank body in order to cut relatively short holes.

The threaded connecting parts may be at least one tubular part having a female square thread formed therein and at least one root having a male square thread formed thereon. The square threads give high connecting strength. Gaps are hardly made between the square threads, so that the coolant is prevented from leaking between them.

In order to easily tap the tubular part, its bottom portion may not be tapped. The tubular part may be fitted with an insert in its bottom to fill the space inside its unthreaded bottom portion so that one end of the root can be in close contact with the insert. The insert prevents the shavings from being caught in the bottom space and thereby enables them to be discharged smoothly.

The front connecting part of the tool shank may include a circumferential stage and a key both formed on it. The rear connecting part of the cutting head may have a circumferential groove and a key groove both formed in it. The circumferential stage and groove can engage with each other so as to prevent the tool shank and the cutting head from moving axially relative to each other. The key and the key groove can engage with each other so as to prevent the tool shank and the cutting head from rotating relative to each other. This makes it possible to connect the cutting head with and detach it from the tool shank quickly and easily by turning them slightly relative to each other.

What is claimed is:

1. A deep hole cutter comprising:
   a tool shank including a front connecting part at the front end thereof;
   the tool shank having a coolant supply passage formed longitudinally therein;
   the tool shank further having a first outer discharge groove formed longitudinally thereof, the first discharge groove V-shaped in radial section; and
   a cutting head including a rear connecting part at the rear end thereof for coaxial and detachable connection with the front connecting part of the tool shank;
   the cutting head having a coolant supply bore formed therein, the supply bore communicating with the supply passage when the cutting head is connected to the tool shank;
   the cutting head further having a second outer discharge groove V-shaped in radial section, the second discharge groove aligned linearly with the first discharge groove when the cutting head is connected to the tool shank;
   the cutting head further having a discharge port formed in the front end thereof substantially diametrically opposite the second discharge groove, the discharge port opening in the peripheral surface of the cutting head;
   the cutting head further having a bypass passage formed therein between the discharge port and the second discharge groove;
   the cutting head further having a plurality of cutting edges formed on the front end thereof, at least one of the cutting edges facing the second discharge groove, at least one other of the cutting edges facing the discharge port;
   the cutting head further having a first outlet port and a second outlet port both formed in the front end thereof and each positioned substantially diametrically opposite the other, the outlet ports communicating with the supply bore.

2. A deep hole cutter as claimed in claim 1, wherein the first and second outlet ports are adjacent to the leading sides of the second discharge groove and the discharge port, respectively, the cutting head having a first coolant guide recess and a second coolant guide recess both formed in the front end thereof;
   the first guide recess extending between the front end of the second discharge groove and the first outlet port;
   the second guide recess extending between the discharge port and the second outlet port.

3. A deep hole cutter as claimed in claim 1 wherein the cutting edges are:
   a central cutting edge adjacent to the second discharge groove;
   a peripheral cutting edge adjacent to the second discharge groove; and
   an intermediate cutting edge adjacent to the discharge port.

4. A deep hole cutter as claimed in claim 1, wherein the tool shank comprises:
   a shank body including a driver that can be rotated and a front connecting part at the front end thereof; and
   a connecting shaft including a rear connecting part at the rear end thereof for coaxial and detachable connection with the front connecting part of the shank body and a front connecting part at the front end thereof for coaxial and detachable connection with the rear connecting part of the cutting head.

5. A deep hole cutter as claimed in claim 4, wherein the front connecting parts of the shank body and the connecting shaft are identical in size and shape, and wherein the rear connecting parts of the connecting shaft and the cutting head are identical in size and shape.

6. A deep hole cutter as claimed in claim 1, wherein the front and rear connecting parts are:
   at least one tubular part having a female square thread formed therein; and
   at least one root having a male square thread formed thereon.

7. A deep hole cutter as claimed in claim 6, wherein the tubular part is fitted with an insert in the bottom thereof to fill the space inside the unthreaded bottom portion thereof so that one end of the root can be in close contact with the insert.

8. A deep hole cutter as claimed in claim 1, wherein the front connecting part of the tool shank includes a circumferential stage and a key both formed thereon, and wherein the rear connecting part of the cutting head has a circumferential groove and a key groove both formed therein;
   the circumferential stage and groove being engageable with each other so as to prevent the tool shank and the cutting head from moving axially relative to each other;
   the key and the key groove being engageable with each other so as to prevent the tool shank and the cutting head from rotating relative to each other.

* * * * *